3,281,396
PRODUCTION OF SPRAYED POLYURETHANE
FILM
Gerald L. Barnes, South Bend, Ind., assignor to United States Rubber Company, New York, N.Y., a corporation of New Jersey
No Drawing. Filed Aug. 6, 1963, Ser. No. 300,189
11 Claims. (Cl. 260—75)

This invention relates to sprayed films of polyurethane elastomer compositions, and more particularly it relates to articles such as fuel cells comprising sprayed films of polyurethane elastomers, as well as to a method of making such sprayed films and articles.

Heretofore it has been difficult to produce, efficiently and economically, satisfactory sprayed films of polyurethane elastomer. Undesirably long curing times and/or undesirably high curing temperatures are required in accordance with conventional practice, and the properties of the films are not all that could be desired. Particular difficulty is encountered in the case of relatively heavy films, such as are required as fuel cells. To obtain a non-cracking film of this kind is particularly difficult. Also, running or sagging of a sprayed polyurethane film is a common difficulty. If it is attempted to forestall this by using, with conventional polyurethane "prepolymers," very active curatives, the material does gel sufficiently fast to prevent running on the sprayed surface, but unfortunately the cured films display considerable cracking, rendering them unfit for any use. It is possible to manufacture sprayed polyurethane films using peroxide-curing polyurethanes, but in this case the cures unfortunately are obtainable only over long periods of time at high temperature. Furthermore, peroxide-containing curable polyurethanes must be sprayed at extremely low solids levels in order to arrive at any type of satisfactory film. It is also possible to use thermoplastic type polyurethane resins in making films, but unfortunately such films are deficient in that they take a considerable permanent set when deformed and they also must be sprayed in very low solids concentration.

The practical difficulties are multiplied in making fuel cells by reason of the fact that the polyurethane composition which is to form the fuel cell is sprayed over a temporary form, such as a cardboard form, which is later dissolved or washed away. The fuel cells are frequently quite large and of unusual shape, and the handling of the sprayed form with the uncured or incompletely cured polyurethane film on its surface presents great difficulties. Heating of the form with the sprayed film thereon in a large oven or the like, for extended periods of time, as required with conventional polyurethane sprayed films, is an awkward, time-consuming, and relatively expensive procedure. Even though the manufacture of fuel cells is a large volume business of considerable economic importance, and those skilled in the art have therefore for a considerable period of time diligently sought ways to overcome the undesirable features of conventional sprayed polyurethane film fuel cell manufacture, a satisfactory solution to the problem has not been forthcoming, prior to the present invention.

The present invention is based on the unexpected discovery that sprayed polyurethane films, which can be cured to a state in which they have excellent pysical properties, at moderately elevated temperatures (even at room temperature) in a relatively short time, are obtainable by the use of polyurethanes in which isocyanate-terminated branches have been induced so that the polyurethane has a functionality of greater than two (on the average) with respect to its ability to react with an active hydrogen containing curative. In accordance with the invention there is provided initially a polyurethane prepolymer which is basically the reaction product of an hydroxy-terminated polymer (polymeric glycol) and an excess of a diisocyanate. Such a prepolymer in its conventional form is essentially linear and being isocyanate-terminated at each end it is bifunctional with respect to its ability to react with active hydrogen containing substances; it can be cured to an insoluble, infusible state with the aid of a curative, such as a diamine, which is bifunctional with respect to its ability to react with isocyanate groups. Conventional compositions of this kind suitable for spraying have required exposure to relatively high temperature for extended periods of time in order to cure properly. In accordance with the invention, a controlled amount of polyfunctionality higher than two (trifunctionality or higher polyfunctionality) is associated with the basic prepolymer. In practicing the invention there are several different ways in which branching or functionality higher than two may be induced. In one embodiment of the invention, functionality greater than two is introduced by subjecting the prepolymer to a heat treatment, which induces branching, so that the prepolymer is no longer substantially linear, but has branches which are isocyanate-terminated, whereby the functionality of the prepolymer with respect to its ability to react with active hydrogen containing reagents becomes greater than two, on the average. In a second embodiment of the invention a small amount of a polyfunctional ingredient having trifunctionality or higher functionality is introduced during the preparation of the prepolymer. Such polyfunctional ingredient may be a triol, which, in the presence of the excess diisocyanate employed in making the prepolymer, results in a branched structure that is isocyanate-terminated; or, such polyfunctional ingredient may be a triisocyanate, which likewise results in a branched, isocyanate-terminated prepolymer; in either case the result is to impart to the prepolymer a functionality greater than two with respect to its ability to react with active hydrogen containing curatives. In a third embodiment of the invention a polyfunctional material having trifunctionality or higher polyfunctionality is combined with the linear prepolymer just at the instant of spraying. Suitable in this form of the invention are triamines or higher polyamines which are trifunctional or higher with respect to their ability to react with isocyanate groups. It is believed that the triamine causes a number of the linear molecules of isocyanate-terminated prepolymer to unite in the form of an isocyanate-terminated branched structure. Regardless of the form of the invention, a bifunctional curative (bifunctional with respect to its ability to react with isocyanate) is combined with the prepolymer at the last possible moment in the spraying operation to bring about the cure of the deposited film. The prepolymer is typically combined with the curative by simultaneously spraying separate streams of prepolymer solution and curative solution into a common spray path in which the ingredients become intimately admixed just prior to being deposited as a film. It will be understood that the entire system is of course organic, that is, non-aqueous, and results in a solid film, as opposed to foam-producing systems containing water. As a result of the thus-introduced functionality higher than two on the average, it is found that the sprayed polyurethane prepolymer, containing the curative, is readily self-curing even at room temperature, and heavy, non-cracking films of good quality can be produced at a rate which permits them to be easily handled in a relatively short time after formation.

In more detail, the polyurethane prepolymer to which the invention applies may be described as a reaction product of an essentially linear hydroxy-terminated starting polymer with a diisocyanate. The polyurethane prepolymer is typically a liquid derived from a starting polymer of molecular weight from 300 to 5,000 having terminal hydroxyl groups. Such polymer may frequently comprise a chain of polyester linkages, or a chain of polyether linkages, or it may be a combination of polyester linkages and polyether linkages. Thus, such polymer may be a chain extended polyester made from a glycol, such as a mixture of ethylene and propylene glycols, and a saturated organic dicarboxylic acid, such as adipic acid. Usually the glycol contains from 4 to 20 carbon atoms, and the acid contains from 4 to 20 carbon atoms. An excess of the glycol over the acid is used in preparing the polymer, so that the resulting polyester contains terminal hydroxyl groups. Usually such an amount of glycol is used as to give a polyester having a hydroxyl number of 20 to 225, and preferably 36 to 75, and a low acid value less than 6 and preferably less than 1. The molecular weight of the polyester usually ranges from 500 to 5,000 and preferably from 1500 to 3,000. In general the most suitable polyesters are chiefly linear in type with melting point levels of 90° C. or lower.

Other examples of suitable polyesters for use in preparing the prepolymer are polyethylene adipate, polyethylene adipate-phthalate, polynoeopentyl sebacate, etc.

As an alternative to the polyesters just described there may be used (for reaction with the polyisocyanate) one or more members of the class of elastomer-yielding polyethers. Such polyethers are typically anhydrous chain-extended polyethers possessing ether linkages (—O—) separated by hydrocarbon chains either alkyl or aryl in nature. The ether should also contain terminal groups reactive to isocyanate, such as alcoholic hydroxyl groups. Usually the polyethers are chiefly linear in type with melting point levels of 90° C. or lower. The molecular weight may range from 500 to 5,000 (i.e., hydroxyl number of about 225 to 22) but is preferably within the range of 750 to 3500 (i.e., hydroxyl number of about 150 to 32). Preferred polyethers may be represented by the formula H(OR)$_n$OH where R is a lower (2–6 carbon atoms) alkylene group and $n$ is an integer such that the molecular weight falls within the range specified. Examples of polyethers used are polyethylene glycol, polypropylene glycol, polypropyleneethylene glycol, and polytetramethylene glycol.

Polyethers not only can be used in place of the polyester but can be used in conjunction with the polyester either as an added reagent or as an intimate part of the polyester molecule thus forming a poly-etherester. Examples of such poly-ether-esters are poly diethylene glycol adipate and poly triethylene glycol adipate.

Further examples of polyesters or polyethers suitable for forming prepolymers useful in the invention are the polyesters and polyethers mentioned in U.S. Patents 2,606,162, Coffey, August 5, 1962; 2,801,990, Seeger, August 6, 1958; 2,801,648, Anderson, August 6, 1957; and 2,814,606, Stilmar, November 26, 1957.

Since all such starting polymers are hydroxy-terminated at each end, they may be referred to as polymeric glycols.

The described hydroxy-terminated polymer or polymeric glycol is, as indicated, reacted with a diisocyanate, that is, an organic diisocyanate, typically an aromatic diisocyanate, such as p,p'-diphenylmethane diisocyanate or toluene diisocyanate, using a considerable molar excess, commonly from a 20% to a 250%, and preferably from a 50% to a 150% molar excess, of the aromatic diisocyanate over that amount which would be required to react with all of the alcoholic hydroxyl groups furnished by the polymeric glycol. The reaction is usually carried out at an elevated temperature (e.g., 90°–150° C. for a period of 1 to 3 hours), under anhydrous conditions, until the reaction is substantially complete, as evidenced by the fact that a substantially constant viscosity is achieved. The prepolymer is a soluble (e.g., in methyl ethyl ketone), uncured, liquid material or a low melting solid which is an essentially linear polyurethane having terminal isocyanate groups, that is, it is essentially a bifunctional material (with respect to its ability to react with active hydrogen containing materials). The invention contemplates associating functionality higher than two (trifunctionality or higher functionality) with such a prepolymer, either by a heat treatment of the prepolymer, or by introducing a trifunctional or similar ingredient in the preparation of the prepolymer, or by introducing a trifunctional or similar ingredient in the final spraying operation. Regardless of the manner in which the trifunctionality or higher functionality is introduced, the spraying composition is made up by dissolving the prepolymer and other desired ingredients, such as pigments and stabilizers (but not the curing agent), in any suitable conventional volatile organic solvent. At the instant of spraying, the solution of polyurethane prepolymer is intimately mixed with a simultaneous spray of the curing agent, which is supplied in the form of a separately prepared solution in a conventional volatile organic solvent. The curing agent takes the form of a bifunctional material (that is, bifunctional with respect to its ability to react with isocyanate) containing two active hydrogens, preferably a diamine, most suitably an aromatic diamine. Methylene dianiline is the preferred curative, although other materials may be used, such as the eutectic blend of methylene diamine and metaphenylene diamine; 3,3'-dimethoxybenzidine may also be used, as may 3,3'-dimethylbenzidine, and the like. Such curing agent is used in amount of from .65 equivalents to .95 equivalents, preferably .85 equivalents, per equivalent of prepolymer. Equivalent or larger amounts of curative are avoided for optimum physical properties. As a result of such reaction, the prepolymer is converted into a cured, cross-linked state in which it is insoluble in the solvents which would ordinarily dissolve the prepolymer. The surprising feature of the sprayable composition prepared in accordance with the invention is that the film deposited by spraying the mixed sprays of polyurethane prepolymer and curing agent, such as on the surface of the fuel cell form, is readily and rapidly self-curing so that the film quickly builds up sufficient strength and hardness to enable the assembly to be handled a relatively short time after the spraying operation. At the same time, this rapid curing quality is provided without encountering difficulties with instability in the spraying solution, or undesirable precure in the spray gun, because the trifunctional polyurethane prepolymer solution is itself sufficiently stable, and it does not become mixed with the curative solution until the separate sprays of these two solutions intermingle at the instant of dual spraying.

An important feature of the invention resides in the fact that it provides a gel time rapid enough so that the sprayed material will not sag but slow enough to prevent gellation in the air. Another important feature is the development of a tough, rather than cheesy, elastomer rapidly even at room temperature. The development of this film strength is evident between one-half and one hour after spraying films of 5 to 50 mil thickness, for example.

The invention thus overcomes disadvantages in the manufacture of polyurethane films by conventional spray methods, wherein considerable problems arise out of the fact that the sprayed applied films tend to be hazy, weak, cheesy in nature and require substantial cure at elevated temperature before the polyurethane film (e.g. fuel cell) can be stripped from the building form. Further, in conventional practice it was found that only very thin films could be applied and each layer had to be at least partially dried before applying the next layer. In the typical polyurethane fuel container, or similar product (e.g., coated fabrics, unsupported films and clothing), the process involves spraying multiple thin layers (1–2 mils) of liquid polyurethane elastomer onto the surface of a form whose outer surface has the configuration for the inner surface of the product. Such forms can be made of cardboard, wood, plastic or metal. In the prepolymers with which trifunctionality is associated in accordance with the invention, spraying onto the surface of the fuel cell forms in the presence of suitable curatives results in clearer, stronger films on exposure to room temperature in less than one hour. Further, multiple film layers of urethane can be applied to the form surface without waiting for each layer to dry before the next is applied. The tensile build-up in the film under room temperature conditions is so rapid that the fuel cell, though not fully cured, can easily be stripped from the fuel cell form in one hour and, on exposure to room temperature conditions, cures in approximately 4 to 6 days. Such improvement is due to branching being induced in the initial linear prepolymer, as described. In the form of the invention in which branching or trifunctionality is induced by an additional heat treatment of the prepolymer, it has been determined for example that when a starting polymer (high molecular weight glycol) having terminal hydroxyl end groups (typically a reaction product of adipic acid and a polyethylene glycol or polypropylene glycol) is reacted with an excess of an isocyanate, in ratio of 1.5 to 2.5 moles of isocyanate to 1 mole of the polyester, to produce a linear prepolymer having an excess of terminal isocyanate groups, which is then heated for an additional period (illustrative—3 hours at 230° F.), a branched prepolymer results which, when spray applied with curative, provides the improved film noted above. The additional heating time (e.g., 3 hours at 230° F.) causes the linear prepolymer to undergo branching (that is, the functionality becomes greater than two) without materially affecting the molecular weight of the prepolymer. The induced branching resulting from the extra heating period results in a higher amine equivalent value which, when compared to the amine equivalent of the linear prepolymer before the heat aging, provides a means for measuring the extent of branching induced. A number of tests have been run from which it has been possible to determine that to obtain the results desired by the invention sufficient branching must be introduced so that the amine equivalent of the initial linear prepolymer is raised at least 30 or 40 points, and preferably 50 points, as a practical minimum with a practical maximum raise in amine equivalent of 300 points. As will be understood by those skilled in the art, the amine equivalent is determined by calculating the percentage of isocyanate groups (NCO) present and thereafter dividing this percentage value into 42, and multiplying the result by 100:

$$AE = \frac{42}{\text{Percent NCO}} \times 100$$

The method for calculating the percentage of NCO groups present is conventional, and is fully described for example in Bulletin No. HR-27 dated July 1958 entitled "Urethane Foams From Polyoxypropylene Glycols of Molecular Weight 2000" on page 13 (appendix), distributed by the Elastomer Chemical Department of E. I. duPont de Nemours & Company, Wilmington 98, Delaware.

By controlling the time and temperature of the additional heat aging period, the prepolymer can be adjusted to result in the increase in amine equivalent (induced branching) desired.

Branching in prepolymers may be calculated if the theoretical (unreacted) amine equivalent is known. The formulation used to calculate this branching is:

Equivalents of prepolymer $(E) =$ $$\frac{\text{Wt. of polymer } (W)}{1 \text{ equivalent wt. } (EW), \text{ or amine equivalent } (AE)}$$

In comparing two polymers before (1) and after (2) branching $$E_1 = \frac{W_1}{AE_1} \qquad E_2 = \frac{W_2}{AE_2}$$

If the weight of polymer is the same in each case, then:

$$(E_1) \times (AE_1) = (E_2) \times (AE_2)$$

or $$(E_1) \times \frac{(AE_1)}{(AE_2)} = E_2$$

This means that the equivalents remaining in a polymer after branching are equal to the theoretical amine equivalent divided by the new or found amine equivalent. For example, if one started with 1,000 grams of a propolymer with a theoretical or charged amine equivalent of 1,000 and by heating or reacting with moisture (that is, without appreciably changing the weight of materials present), the amine equivalent is raised to 1250. There is one equivalent of this polymer to start:

$$E_1 \times \frac{W_1}{AE_1} = \frac{1000}{1000} = 1.00$$

After branching the equivalents present are:

$$E_2 = E_1 \times \frac{AE_1}{AE_2} = 1 \times \frac{1000}{1250} = 0.80$$

Therefore 0.20 equivalent have been used up in branching (1.00−0.80=0.20). Since the equivalents are numbers describing numbers of molecules present of each of the types in question, it can be said that there were originally ten molecules each having one —NCO group (OCN—R—)

After branching, there were eight equivalents each having one —NCO group but only six of these are like the original, the other two have branches.

For purposes of the invention, an amine equivalent increase of about 30 to 80 points will give good spray results with materials having no free diisocyanates. With materials which do have free diisocyanate, a slightly higher level of branching is frequently required, for example 100 to 150 points. In general, the minimum desirable increase in amine equivalent is about 30 to 40 points, and preferably the minimum is about 50 points, and usually it is not necessary to provide an increase of more than about 300 points. Since branching does have some adverse effect on cut growth, we usually do not induce any more branching than is necessary under the circumstances of a particular case.

In the form of the invention wherein branching is induced by subjecting the prepolymer to a heat treatment, it is usually sufficient to heat the prepolymer for an additional period of from 2 to 48 hours, at a temperature of from 90° to 150° C. It will be understood that this additional heating period is over and above the conventional heating period employed in making the prepolymer; such conventional heating period is usually for a period of 1 to 3 hours at a temperature of 90° to 150° C., and is sufficient to achieve a substantially constant viscosity.

As indicated, the improved prepolymers for spray applications make use of conventional aromatic diamines as curatives. Generally, in spray applications the heat aged prepolymer containing excess isocyanate end groups (with induced branching as described above—that is, more than two available isocyanate groups on the average) is added to sufficient solvent or diluent to reduce the viscosity to spray consistency. The aromatic diamine is also added (separately) to a solvent, or in a few instances a diluent. Solvents are generally chosen which will evaporate at a rate which will insure that substantial surface evaporation will occur between gun and form surface. The two solvent solutions are sprayed through a conventional two-component spray gun system.

In the form of the invention in which branching is induced by including a trifunctional or higher polyfunctional material in the preparation of the prepolymer, there may be employed such materials as polyols (triols or higher) such as trimethylolpropane or polyisocyanates (triisocyanates or higher) such as 2,4,4'-triisocyanatodiphenylether. Such trifunctional material is added prior to completion of the reaction between the starting polymer in the excess diisocyanate to form the prepolymer. Frequently the polyfunctional material is added at the start of the prepolymer preparation, although it can also be added later on in the prepolymer preparation step, especially in the case of sufficiently highly reactive polyfunctional reagents.

Such polyfunctional material is added in only relatively small amount to the prepolymer-forming ingredients. Thus, in many cases as little as 0.05 mole of the trifunctional material, per mole of polyester or polyether may be sufficient to provide noticeably improved results, although usually it is preferred to use somewhat more than this, say at least 0.1 mole of trifunctional material per mole of hydroxy-terminated polymer. In most cases it is unnecessary to use more than about 0.2 or 0.3 mole of trifunctional material per mole of hydroxy-terminated polymer. Of course, the use of an excessive amount of trifunctional material is avoided as this could cause the prepolymer to set up or become insoluble. The reaction conditions under which the prepolymer is prepared may otherwise be conventional.

In the form of the invention wherein the trifunctional ingredient or ingredient of higher functionality is incorporated at the time of spraying, polyfunctional amines (triamines or higher) are suitable, especially highly active amines, such as primary amines, particularly primary aromatic amines, such as 4,4',4''-triamino triphenylmethane. The amount of such polyfunctional amine employed may be the same as disclosed in the previous paragraph for the amount of polyisocyanate or polyol, that is, as little as 0.05 mole of polyamine per mole of prepolymer, preferably at least 0.1 mole, but ordinarily not more than 0.2 or 0.3 mole. The polyamine is combined with the prepolymer at the instant of spraying in the same manner as the bifunctional curative is combined, that is, the polyamine is introduced as a solution in a volatile organic solvent, separate from the prepolymer solution until the last minute. Conveniently the polyamine is introduced in the same solution as the bifunctional curative. The polyamine becomes intimately mixed with the prepolymer in the course of the dual spraying operation. The amount of bifunctional curative employed is decreased by an amount equivalent to the amount of polyfunctional amine added.

The following examples will serve to illustrate the practice of the invention in more detail:

Example 1

*Part A.*—This part of the example does not illustrate the practice of the invention, but simply shows the unsatisfactory results obtained when a conventional prepolymer is used, without heat treatment.

A polyester having a molecular weight of 2080 and an acid value of 0.5 was prepared from 0.98 mole of ethylene glycol, 0.42 mole of 1,2-propylene glycol and 1.0 mole of adipic acid. 2080 grams (1 mole) of the polyester was heated to 60° C. in a 3-necked flask, provided with a mechanical stirrer, a dry nitrogen inlet tube, a condenser and a thermometer, 348 grams (2 moles) of toluene diisocyanate (80% 2,4-isomer and 20% 2,6-isomer) was added to the polyester and the mixture was heated at 90° C. for 90 minutes. A blanket of dry nitrogen over the reaction mixture kept out atmospheric moisture and oxygen. The prepolymer formed was of light amber color and had an amine equivalent of 1,214.

100 grams of the prepolymer was dissolved in 100 grams of methyl ethyl ketone to form component A. 6.9 grams of methylene dianiline was dissolved in 62.1 grams of methyl ethyl ketone to form component B. The ratio of solvent to active ingredient in both components A and B is variable with the amounts shown chosen to provide a material of sprayable viscosity.

A 40 gauge film, applied in a series of 2 mil film applications, by simultaneously spraying equal quantities of components A and B through a two-head spray gun, showed heavy cracking during the drying operation (room temperature conditions or low heat up to 160° F. to evaporate solvent), was cloudy in appearance and remained weak and cheesy even after several days at room temperature. Heating this film for 3 hours at 212° F. produced a satisfactory cure.

*Part B.*—This part of the example illustrates the invention. The prepolymer prepared in Part A was further heated for 3 hours at 230° F. in accordance with the invention prior to dissolving in the methyl ethyl ketone solvent. Components A and B were made as indicated in Part A and a 40 mil film was prepared in the same manner as in Part A. The amine equivalent of the prepolymer after heating for 3 hours at 230° F. was 1300. The resulting film showed no cracking upon evaporation of the solvents, was clear in appearance and was sufficiently strong in 1 hour at room temperature. This film acquired approximately 65% of its total cure in a 24 hour period as indicated by a tensile of 3500 pounds. The extra heating step (3 hours at 230° F.) of this Part B results in a slight increase in the viscosity of the prepolymer as prepared in Part A.

Example 2

This example shows the incorporation of trifunctionality in the prepolymer by adding a trifunctional material, rather than by an extra heating step as in Part B of Example 1. The prepolymer was prepared from polypropylene ether glycol of molecular weight 1200 and a hydroxyl value of 93.4. 1200 grams (1 mole) of the polyether was heated to 60° C. in a 3-necked flask equipped with a mechanical stirrer, a dry nitrogen inlet tube, a condenser and a thermometer. 331 grams (1.9 mole) of toluene diisocyanate and 98 grams (0.15 mole) of a polyisocyanate (namely, the reaction product of 3 moles of toluene diisocyanate and 1 mole of trimethylol propane, "Mondur CB-75") was added and the mixture was heated to 90° C. for 90 minutes. The prepolymer was of a light amber color and had an amine equivalent weight of 730.

100 grams of this prepolymer was dissolved in 100 grams of methyl ethyl ketone to form component A. 11.4 grams of methylene dianiline was dissolved in 102.6 grams of methyl ethyl ketone to form component B. These components, as were components A and B in Example 1, were sprayed through a 2-head spray gun in equal proportions to form a 40 mil film (on repeated passes of 2–3 mils). The film formed was clear, free of cracks, and developed high tensile strength at room temperature, sufficient in one hour to readily strip the film from the surface, and which gained approximately 65% of its total cure in 24 hours at room temperature as evidenced by a tensile of 2000 pounds as compared to a fully cured tensile of 3000 pounds.

Example 3

This example also illustrates the inclusion of a trifunctional material in the prepolymer as prepared.

The polypropylene ether glycol described in Example 2 was reacted, in the same apparatus and manner as in Example 2, with 348 grams (2 moles) of toluene diisocyanate; the mixture was heated to 90° C., at which point 14 grams (0.1 mole) of trimethylol propane was added. The temperature of the mixture was then maintained at 90° C. for 90 minutes. The prepolymer was of light amber color and had an amine equivalent weight of 1050.

100 grams of this prepolymer was dissolved in 100 grams of methyl ethyl ketone to form component A. 8 grams of methylene dianiline was dissolved in 72 grams of methyl ethyl ketone to form component B. Components A and B were applied through a 2-head spray system in equal proportions to form a 40 gauge film in the form of repeated passes of 2 mils. The resulting film, at the end of one hour, was cured sufficiently to achieve a tensile strength which permitted the film to be readily removed from the surface. This film gained approximately 65% of its cure in 24 hours at room temperature as evidenced by a tensile of 2000 pounds as compared to tensiles of 3000 pounds in fully cured film.

Example 4

This example illustrates the inducement of branching in a polyether prepolymer by heat treatment. Part A is included to show the unsatisfactory results obtained if branching is not induced, in contrast to the satisfactory results obtained in Part B.

*Part A.*—The polypropylene ether glycol employed in Examples 2 and 3 was reacted with, in the manner indicated in Example 3, 348 grams (2 moles) of toluene diisocyanate at a temperature of 90° C. for 90 minutes. The prepolymer formed was of light amber color and had an amine equivalent of 775.

100 grams of this prepolymer was dissolved in 100 grams of methyl ethyl ketone to form component A. 10.75 grams of methylene dianiline was dissolved in 96.75 grams of methyl ethyl ketone to form component B. Components A and B were sprayed through a 2-head spray gun, in equal proportions, to form 40 gauge film by repeated applications of 2 mil layers. The resulting film, after drying at room temperature or drying up to 160° F. as indicated in Example 1, displayed extensive cracking, was cloudy, and was very cheesy. The film could be fully cured by the additional heating step referred to in Example 1, Part A.

*Part B.*—The prepolymer of Part A was further heated for a period of 3 hours at 212° F., a treatment which increased the amine equivalent of the prepolymer to 865 (increase of 90 points). Components A and B were made up using this post-treated prepolymer in the same manner as in Part A. A 40 gauge film was sprayed in the manner described previously. This film, after one hour at room temperature, was cured sufficiently to acquire a tensile permitting the film to be stripped from the surface. This film was free of cracks, blisters and was clear and acquired approximately 65% of its total cure at room temperature in 24 hours as evidenced by a tensile of 2000 pounds as compared to fully cured tensiles of 3000 pounds.

Example 5

This example illustrates the practice of the invention by a post-heating of prepolymer formed from a different polyether.

*Part A.*—Polytetramethylene ether glycol having a molecular weight of 2523, and an acid value of 0.10 was employed. 2523 grams (1 mole) of the polyether was heated to 60° C. in a 3-necked flask, provided with a mechanical stirrer, a dry nitrogen inlet tube, a condenser and a thermometer. 348 grams (2 moles) of toluene diisocyanate was added to the polyether and the mixture was heated to 90° C. for 90 minutes. A blanket of dry nitrogen over the reaction mixture kept out atmospheric moisture and oxygen. The prepolymer was of a light amber color and had an amine equivalent of 1440.

100 grams of this prepolymer were dissolved in 100 grams of methyl ethyl ketone to form component A. 5.8 grams of methylene dianiline were dissolved in 52.5 grams of methyl ethyl ketone to form component B. A film was formed by spraying these components in the same manner indicated previously. The film so formed (40 gauge) was cheesy, cloudy, and contained many cracks after drying for several days at room temperature. This film could be cured in the same manner as indicated in Example 1, Part A.

*Part B.*—The prepolymer of Part A was further heated for 3 hours at 212° F., a treatment which increased the amine equivalent to 1570 (increase of 130 points). Components A and B were made up as indicated in Part A and was sprayed in the usual amount. The resulting film (40 gauge) achieved sufficient strength after one hour at room temperature so that the film could be easily removed from the surface. This film achieved 65% of its ultimate cure, and tensile, after 24 hours at room temperature as evidenced by a tensile of 2600 pounds as compared to fully cured tensiles of 4000 pounds.

Example 6

This example illustrates the form of the invention in which the trifunctional material is combined at the time of spraying.

100 grams of the prepolymer of Example 1, Part A, (not post-heated for 3 hours at 212° F.) was dissolved in 100 grams of methyl ethyl ketone to form component A. 5.5 grams of methylene dianiline and 1.8 grams of 4,4′,4″-triamino triphenyl methane were dissolved in 62.2 grams of methyl ethyl ketone to form component B. In this instance, any trifunctional amine, preferably aromatic, can be used. These components were sprayed in the manner described previously to result in a 40 mil film. The film so formed was clear, did not contain any cracking and gained tensile strength rapidly through rapid cure.

The following table expresses the tensile strengths (pounds per square inch) attained with increasing periods of time:

| | |
|---|---|
| 2 hours after spraying | 2000 |
| 1 day | 4100 |
| 2 days | 4900 |
| 3 days | 5400 |
| 6 days | 6000 |

Again, this film was only exposed to room temperature conditions in order to achieve cure.

To make a fuel cell for airplanes, the usual cardboard form of similar form of the desired shape is provided, and a polyurethane film of the desired thickness is sprayed thereon, as described in the examples of the invention. After standing for about one hour at room temperature, the film can be stripped from the form, and used as a fuel cell, after a lapse of sufficient time to enable the full physical properties to be developed (and of course, after the application of the usual fittings or accessories).

The invention is also useful for making other articles comprising supported or unsupported sprayed polyurethane films, such as footwear, wading boots, protective clothings, gloves, coated fabrics, etc.

I am aware of U.S. Patent 3,009,764 issued to Urs on November 21, 1961, which shows how a polyester prepolymer may be heat treated to induce branching. Such a heat-treated prepolymer may be used in the present invention. The Urs patent teaches the use of such a prepolymer in making elastic thread. There is no suggestion of the use of such a prepolymer in making sprayed films in accordance with the present invention.

Hostettler 2,933,477, April 19, 1960, refers to the extension of linear polymers, but makes no mention of any branched polymers. Further, the polyfunctional materials described in Hostettler are always used in molar and mole excess, an important distinction from the present invention which always uses less than an equal mole ratio of bifunctional curative material to prepolymer.

Young et al. 2,933,478, April 19, 1960, also refers to linear polymers and does not make any reference to branched polymers. Again, this patent indicates that the bifunctional reactant (the curative in the present system) must be used in a mole excess which differs from the present system.

Having thus described my invention, what I claim and desire to protect by Letters Patent is:

1. A method of making a sprayed polyurethane film comprising in combination the steps of:
   (A) providing an isocyanate-terminated branched polyurethane prepolymer having more than two available isocyanate groups per molecule, said prepolymer being selected from the group consisting of
      (a) product obtained by heating one mole of a polymeric glycol with from 1.5 to 2.5 moles of an aromatic diisocyanate at a temperature of 90° to 150° C. for a period of 1 to 3 hours to provide a linear isocyanate-terminated prepolymer and tereafter further heat-treating the resulting reaction product at a temperature of 90° to 150° C. for a period of 2 to 48 hours to induce branching in the reaction product and to increase its amine equivalent by 30 to 300 points, and
      (b) a branched reaction product of one mole of a polymeric glycol with from 1.5 to 2.5 moles of an aromatic diisocyanate and from 0.05 to 0.3 mole of a trifunctional material selected from (i) trimethylolpropane, (ii) 2,4,4'-triisocyanatodiphenyl ether, and (iii) the reaction product of 3 moles of toluene diisocyanate with 1 mole of trimethylolpropane,
   the said polymeric glycol employed in (a) and (b) having a molecular weight of from 500 to 5000 and being a poly (lower alkylene) ether glycol or a chain extended polyester of a glycol having from 4 to 20 carbon atoms with a saturated organic dicarboxylic acid having from 4 to 20 carbon atoms;
   (B) dissolving the said branched polyurethane prepolymer in an inert, volatile, organic solvent;
   (C) providing a separate solution in an inert, volatile, organic solvent, of an aromatic diamine curative;
   (D) separately spraying the solution resulting from steps (B) and (C);
   (E) bringing the resulting sprays together into a common spray path wherein the two sprays become mingled together; and
   (F) depositing the resulting mixed spray in the form of a film which is rapidly self-curing at room temperature.

2. A method as in claim 1 in which the said polyurethane prepolymer is a prepolymer as in (a) wherein the said polymeric glycol is ethylene-propylene adipate of 1500 to 3000 molecular weight, the said aromatic diisocyanate is toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

3. A method as in claim 1 in which the said polyurethane prepolymer is a prepolymer as in (a) wherein the said polymeric glycol is polypropylene ether glycol of 750 to 3500 molecular weight, said aromatic diisocyanate is toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

4. A method as in claim 1 in which the said polyurethane prepolymer is a prepolymer as in (a) wherein the said polymeric glycol is polytetramethylene ether glycol of 750 to 3500 molecular weight, said aromatic diisocyanate is toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

5. A method as in claim 1 in which the said polyurethane prepolymer is a prepolymer as in (b) wherein the said polymeric glycol is ethylene-propylene adipate of 1500 to 3000 molecular weight and the said aromatic diisocyanate is toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

6. A method as in claim 1 in which the said polyurethane prepolymer is a prepolymer as in (b) wherein the said polymeric glycol is polypropylene ether glycol of 750 to 3500 molecular weight, said aromatic diisocyanate is toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

7. A method as in claim 1 in which the said polyurethane prepolymer is a prepolymer as in (b) wherein the said polymeric glycol is polytetramethylene ether glycol of 750 to 3500 molecular weight, said aromatic diisocyanate is toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

8. A method of making a sprayed polyurethane film comprising in combination the steps of:
   (A) providing a linear polyurethane prepolymer having terminal isocyanate groups at each end, which is a reaction product of one mole of a polymeric glycol with from 1.5 to 2.5 moles of an aromatic diisocyanate, the said polymeric glycol having a molecular weight of from 500 to 5000 and being selected from (a) poly (lower alkylene) ether glycol or (b) chain extended polyester of a glycol having from 4 to 20 carbon atoms with a saturated organic dicarboxylic acid having from 4 to 20 carbon atoms;
   (B) dissolving said linear polyurethane prepolymer in an inert, volatile, organic solvent;
   (C) providing a separate solution, in an inert, volatile, organic solvent, of both 4,4',4''-triaminotriphenylmethane and an aromatic diamine curative;
   (D) separately spraying the solution resulting from steps (B) and (C);
   (E) bringing the resulting sprays together into a common spray path wherein the two sprays become mingled together; and
   (F) depositing the resulting mixed spray in the form of a film which is rapidly self-curing at room temperature.

9. A method as in claim 8 in which the said polyurethane prepolymer is a reaction product of ethylenepropylene adipate of 1500 to 3000 molecular weight with toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

10. A method as in claim 8 in which the said polyurethane prepolymer is a reaction product of polypropylene ether glycol of 750 to 3500 molecular weight with toluene diisocyanate, and the said aromatic diamine curative employed in step (C) is selected from methylene dianiline, methylenediamine/metaphenylenediamine blend, 3,3'-dimethoxybenzidine and 3,3'-dimethylbenzidine.

11. A method as in claim 8 in which the said polyurethane prepolymer is a reaction product of polytetramethylene ether glycol of 750 to 3500 molecular weight with toluene diisocyanate, and the said aromatic diamine curative employed in step (C) is selected from methylene dianiline, methylenediamine/metaphenylenediamine blend, 3,3′-dimethoxybenzidine and 3,3′-dimethylbenzidine.

References Cited by the Examiner

UNITED STATES PATENTS

| | | | |
|---|---|---|---|
| 2,779,689 | 1/1957 | Reis | 117—104 |
| 2,814,834 | 12/1957 | Hess et al. | 260—75 |
| 2,884,340 | 4/1959 | Loshaek | 117—105.5 |
| 2,901,467 | 8/1959 | Croco | 260—77.5 |
| 2,933,477 | 4/1960 | Hostettler | 260—77.5 |
| 2,955,058 | 10/1960 | Foster | 117—104 |
| 3,009,764 | 11/1961 | Urs | 260—75 |
| 3,105,062 | 9/1963 | Graham et al. | 260—75 |

LEON J. BERCOVITZ, *Primary Examiner.*

J. J. KLOCKO, *Assistant Examiner.*